United States Patent
Chung

(10) Patent No.: US 6,924,854 B2
(45) Date of Patent: Aug. 2, 2005

(54) STRUCTURE FOR TFT-LCD

(75) Inventor: Jae-Young Chung, Busan (KR)

(73) Assignee: LG.Philips LCD Co., Ltd., Seoul (KR)

(*) Notice: Subject to any disclaimer, the term of this patent is extended or adjusted under 35 U.S.C. 154(b) by 190 days.

(21) Appl. No.: 10/163,418

(22) Filed: Jun. 7, 2002

(65) Prior Publication Data

US 2002/0186331 A1 Dec. 12, 2002

(30) Foreign Application Priority Data

Jun. 11, 2001 (KR) ........................................ 2001-32505

(51) Int. Cl.[7] .......................................... G02F 1/136
(52) U.S. Cl. .............................. 349/43; 257/59; 257/72
(58) Field of Search ............................. 349/42, 43, 46; 257/59, 72

(56) References Cited

U.S. PATENT DOCUMENTS

| | | | | |
|---|---|---|---|---|
| 4,762,398 A | * | 8/1988 | Yasui et al. ................... 349/43 |
| 4,902,638 A | * | 2/1990 | Muto ............................ 438/4 |
| 5,414,283 A | * | 5/1995 | den Boer et al. ............. 257/59 |
| 5,656,824 A | * | 8/1997 | den Boer et al. ............. 257/59 |
| 6,256,077 B1 | * | 7/2001 | Baek ............................ 349/43 |
| 6,339,456 B1 | * | 1/2002 | Nagano ........................ 349/42 |
| 6,573,954 B1 | * | 6/2003 | Hirose et al. ................. 349/43 |
| 6,664,569 B2 | * | 12/2003 | Moon ........................... 257/72 |
| 6,671,022 B1 | * | 12/2003 | Lee et al. ..................... 349/141 |

FOREIGN PATENT DOCUMENTS

| | | |
|---|---|---|
| KR | 1993-0022595 | 11/1993 |
| KR | 2000-0073727 | 12/2000 |

* cited by examiner

Primary Examiner—Robert H. Kim
Assistant Examiner—David Chung
(74) Attorney, Agent, or Firm—McKenna Long & Aldridge LLP

(57) ABSTRACT

A structure for a thin film transistor LCD includes a data line extending in a first direction; a source electrode protruded for a predetermined length from the data line; a gate electrode in a second direction so as to be overlapped with a portion of the source electrode and the data line; and a drain electrode of which a portion is overlapped with the gate electrode. The drain electrode is bent according to the contours of the data line and the source so that wider channel can be obtained even without increasing the width of the gate electrode. A pixel electrode is connected to a region of the drain which is not overlapped with the gate electrode and positioned at the inner side of the region forming the data line and the gate electrode.

6 Claims, 4 Drawing Sheets

STRUCTURE FOR TFT-LCD

This application claims the benefit of Korean Patent Application No. 2001-32505, filed on Jun. 11, 2001, which is hereby incorporated by reference for all purposes as if fully set forth herein.

BACKGROUND OF THE INVENTION

1. Field of the Invention

The present invention relates to a structure for a Thin Film Transistor Liquid Crystal Display (TFT-LCD) Devise, and more particularly, to a structure for a TFT-LCD in which a thin film transistor channel structure is changed to increase a channel width and a process margin, thereby preventing a degradation of its characteristics.

2. Discussion of the Related Art

FIGS. 1A through 1E generally illustrate a sequential fabrication process of a general thin film transistor substrate for a liquid crystal display (LCD) device.

As shown in the drawings, the process of fabricating a general thin film transistor LCD includes the steps of: depositing a metal on the entire surface of an upper portion of a glass substrate 1, and forming a gate line/electrode 2 at one upper portion of the glass substrate 1 by patterning the metal by a photo-etching process (FIG. 1A); sequentially depositing a gate insulation film 3 and amorphous silicon on the entire upper surface of the resulting structure, and patterning the amorphous silicon to form an active region above the gate insulation film 3 over the gate line/electrode 2 to overlap the sides of the gate electrode 2 (FIG. 1B); depositing a metal over the entire surface of the resulting structure, and patterning the metal to form a source electrode 5 and a drain electrode 6 spaced apart from each other by a region over a central portion of the active region 4 (FIG. 1C); depositing a passivation film 7 over the entire surface of the resulting structure, and forming a contact hole in the passivation film 7 to expose an upper surface of the drain electrode 6 (FIG. 1D); depositing a transparent conductive material such as Indium Tin Oxide (ITO) over the entire upper surface of the resulting structure, patterning the ITO so as to be connected to the exposed surface of the drain electrode 6 so as to form a pixel electrode 8 positioned at an upper portion of the gate insulation film 3 where no active region 4 has been formed.

A method for fabricating a lower substrate of the thin film transistor LCD constructed as described above will now be explained.

First, as shown in FIG. 1A, the metal is deposited at the entire upper surface of the glass substrate 1 and patterned through a photo-etching process, to form the gate line/electrode 2 the surface of the glass substrate 1.

Next, as shown in FIG. 1B, the gate insulation film 3 is deposited over the resulting structure, and the amorphous silicon is deposited on the gate insulation film 3.

And then, the amorphous silicon is patterned through the photo-etching process to form the active region 4 over the gate line/electrode 2 and on the gate insulation film 3.

And, as shown in FIG. 1C, the metal is deposited on the entire upper surface of the resulting structure. The deposited metal is then patterned by a photo-etching process to form the source electrode 5 and the drain electrode 6, which are spaced apart from each other by a channel region over a central portion of the active region 4 and overlapping the sides of the active region 4, above the gate insulation film 3. Thus, a thin film transistor (TFT) including the gate line/electrode 2, the active region 4, the source electrode 5, and the drain electrode 6 is formed.

Next, as shown in FIG. 1D, the passivation film 7 is deposited on the entire upper surface of the resulting structure, and then a contact hole 10 is formed in the passivation film 7 through the photo-etching process, thereby exposing a portion the drain electrode 6.

Then, as shown in FIG. 1E, an ITO, a transparent conductor, is deposited over the entire upper surface of the resulting structure and patterned by the photo-etching process so that the pixel electrode 8 is formed over a part of the drain electrode 6 and the contact hole 10 and also in a flat area where the glass substrate 1, the gate insulation film 3 and the passivation film 7 are sequentially deposited adjacent to the active region 4 and the TFT The pixel electrode 8 is connected to the drain electrode 6 through the contact hole 10 in the passivation film 7.

FIG. 2 shows a structure of the TFT-LCD in accordance with a conventional art.

As shown in FIG. 2, the TFT-LCD includes the gate line/electrode 2 formed horizontally in the context of the figures; a data line 9 formed vertically in the context of the figure and crossing the gate line/electrode 2; a source electrode 5 overlapping the gate line/electrode 2 at a central lower side of the gate line/electrode 2 in the context of the figure. The source electrode 5 perpendicularly extends from the data line 9 and includes an end portion that is parallel to the data line 9 so that the end portion parallel to the data line 9 overlaps the gate line/electrode 2. As shown, the TFT-LCD includes a drain electrode 6 overlapping the gate line/electrode 2 and spaced from a side of the source electrode 5 facing the drain electrode 6 to define a substantially 'U'-shaped channel region. The TFT-LCD further includes a pixel electrode 8 connected to the drain electrode 6 and positioned at an inner side of a quadrangle formed by the data line 9 and the gate line/electrode 2.

The structure of the conventional TFT LCD constructed as described above will now be explained in detail.

First, the thin film transistor of the TFT LCD has the channel structure of 'U' shape, so that the ratio between the channel length and the channel width is high. As the ratio between the channel length and the channel width is great, mobility of electric charge moving through the channel becomes excellent, and a video signal applied through the data line 9 can be applied to the pixel electrode 8 connected to the drain electrode 6 with a relatively low voltage. In order to have the structure, the data line 9 is formed long and the source electrode 5 extends from the data line 9. The end of the extended portion of the source is bent to be parallel to the data line 9. The source electrode 5 and the data line 9 are substantially one, and in consideration of the fact that the data line 9 performs the same role as that of the source, the data line 9 and the source electrode 5 are formed to have the 'U' shape so as to form the U-shaped channel region with respect to the drain electrode 6.

The channel region is formed by the source electrode 5, the drain electrode 6 and the gate line/electrode 2. That is, as the drain electrode 6 overlaps the gate line/electrode 2 and positioned corresponding to the inner side of a 'U' shaped formed by the data line 9, the portion of the source electrode 5 perpendicular to the data line 9 and the end portion of the source electrode 5, so as to form the U-shaped channel.

As the channel region defined by the source electrode 5, the drain electrode 6 and the gate line/electrode 2 has the U-shape, the overall length of the channel is relatively increased.

However, a problem of the above structure is that the source electrode 5 extends in the horizontal direction from a portion of the data line 9 and the end portion of the extended portion is bent to be parallel to the data line 9. Thus, in order to overlap the entire source electrode 5 with the gate line/electrode 2, the gate line/electrode 2 should be wide, and accordingly, the numerical aperture of a display device (aperture ratio), i.e., the area for transmitting light, is reduced.

That is, in view of the characteristics of the thin film transistor display device, the thin film transistor region including the data line 9, the gate line/electrode 2, the source electrode 5, the drain electrode 6 and the active region 4 does not allow light to be transmitted, thus reducing the display area. Reducing the area of this "non-transmission region" makes better use of the light source, and thus there is better light efficiency of back light and characteristics of the display device such as a luminance characteristic are improved.

However, in the structure described above, the width of the gate line/electrode 2 is considerably increased, which reduces the area for transmitting light so that the characteristics of the display device are degraded.

In addition, if the gate line/electrode 2 or the drain electrode 6 are moved left or right or up or down with respect to each other, for example, unexpectedly due to a process change or the like, the gate line/electrode 2 and the drain electrode 6 may not overlap one another, and in such a case, the thin film transistor may not operate.

Even if such a serious position change does not occur, if the actual area that the drain electrode 6 and the gate line/electrode 2 are overlapped is changed, the parasitic capacitance value between the gate line/electrode 2 and the drain electrode 6 may be changed. Thus, the characteristics of the device would be changed and an accurate operation of the display device is hardly expected.

In consideration of the fact that the capacitance varies according to the position change of each region forming the thin film transistor, a structure for maintaining the same capacitance between the gate and drain regardless of the position change of each region has been proposed as shown in FIG. 3.

FIG. 3 illustrates the structure in which a capacitance between the gate drain and the gate source is not changed even if the positions of each region of the thin film transistor LCD are changed.

As shown in FIG. 3, the structure for a thin transistor LCD includes a data line 9 extending vertically in the context of the figure; a gate line/electrode 2 extending horizontally in the context of the figures which is overlapped with a predetermined area of the data line 9. A source electrode 5 and a drain electrode 6 are in parallel to the data line 9 and wider than the width of the gate line/electrode 2. A pixel electrode, a part of which is connected to the drain electrode 6, is positioned at a central portion of a pixel region formed by the data line 9 and the gate line/electrode 2.

The structure of the thin film transistor LCD constructed as described above will now be explained in more detail.

The structure as shown in FIG. 6 is featured in that since the area where the gate and the source or the gate and the drain are overlapped is not changed according to the position change of at the upper and lower portion of the right and left portion of the gate line/electrode 2, so that its capacitance is constant.

In order to implement the structure, the data line 9 is positioned vertically long with a certain width, and the gate line/electrode 2 is also positioned horizontally long with a certain width, having the constant area that the gate line/electrode 2 and the data line 9 are overlapped. The overlapped portion serves as the source electrode 5.

Even if the gate line/electrode 2 or the data line 9 are moved vertically or horizontally to be formed due to a change in a process, the overlapped area is constantly uniform, and thus, there is no capacitance change between the source and the gate.

In addition, like the data line 9, the drain electrode 6 is also disposed extends vertically in the context of the figures, so that a constantly uniform area is overlapped with the gate line/electrode 2. Thus, a constant capacitance is formed between the drain electrode 6 and the gate line/electrode 2 regardless of the position of the gate line/electrode 2 with respect to the drain electrode 6.

As a matter of course, the data line 9 is commonly used between pixels and the drain electrode 6 is independently positioned in each pixel. In this case, if the position of the gate line/electrode 2 is changed excessively with respect to the drain electrode 6 due to the difference of the length, the drain electrode 6 and the gate line/electrode 2 may be overlap. The amount of such a position change could be so much as not to use the entire display device. Thus, the margin space allowed in manufacturing process should be considerably increased compared to the embodiment of FIG. 2 to ensure placement of the drain electrode 6 to overlap the gate line/electrode 2 sufficiently. However, in such a structure, the length of the channel is the same as the width of the gate line/electrode 2, i.e., the width of the channel is no longer than the width of the gate line/electrode 2. Thus, in order to obtain a greater channel length, the width of the gate line/electrode 2 needs to be increased. Then, however, the light efficiency, a aperture ratio and other characteristics of the display device are degraded.

As above mentioned, the conventional structure for a thin film transistor LCD has problems that the width of the gate electrode must be increased to widen the width of the channel, the light efficiency is degraded due to the increase in the width of the gate electrode, and the aperture efficiency of the display device is reduced thus degrading the luminance characteristic. In the U-shaped structure for remarkably increasing the width of the channel, since the allowance of the process margin is low, even though the position of each region forming the thin film transistor LCD is a bit changed, the capacitance between the source and the drain is changed causing each pixel to have a different operation characteristic, degrading the reliability of the entire display device. In addition, the driving the LCD device described above is difficult because of the variance in capacitance from pixel region to pixel region, and the characteristic of the display device is deteriorated.

SUMMARY OF THE INVENTION

Therefore, an advantage of the present invention is to provide a structure for a thin film transistor LCD that is capable of preventing the change of a capacitance by obtaining wide of channel and improving a process margin allowance.

To achieve these and other advantages and in accordance with the purpose of the present invention, as embodied and broadly described herein, there is provided a structure for a thin film transistor LCD includes a data line; a source electrode protruded for a predetermined length from the data line; a gate electrode overlapping a portion of the source electrode and the data line; a drain electrode having a portion overlapped with the gate electrode, the drain electrode being bent according to the form made by the data line and the source; and a pixel electrode connected to a region of the drain that is not overlapped with the gate electrode and positioned at the inner side of the region forming the data line and the gate electrode.

In another aspect of the present invention, a liquid crystal display device includes a data line; a gate line substantially perpendicular to the data line; a source vertically protruded for a predetermined length from the data line; a drain electrode having a portion overlapping the gate line, the drain electrode bent to follow a contour of the data line and the source; and a pixel electrode connected to a region of the drain electrode that does not overlap the gate line and positioned at an inner side of the region forming the data line and the gate line.

These and other features, aspects and advantages of the present invention will become more apparent from the following detailed description of the present invention when taken in conjunction with the accompanying drawings.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

The structure for a thin film transistor LCD will now be described in detail with reference to the accompanying drawings.

Figure 4:
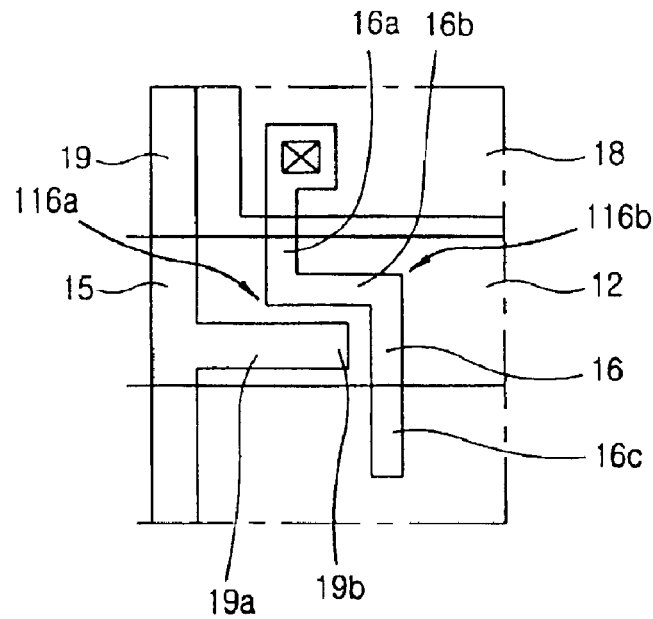
FIG. 4 is a plan view of a thin film transistor LCD in accordance with one embodiment of the present invention.

FIG. 4 is a plan view of a thin film transistor LCD in accordance with one embodiment of the present invention.

As shown in FIG. 4, the thin film transistor LCD includes a gate line/electrode 12 extending horizontally in the context of the figure and a data line 19 extending vertically in the context of the figure. The data line 19 has a protrusion 19a on one side that extends horizontally from the data line 19 and overlaps a central portion of the gate line/electrode 12.

In this way, the portion of the data line 19 overlapping the gate line/electrode 12 and the protrusion 19a together serve as a source electrode 15 for a thin film transistor. The thin film transistor LCD further includes a bent drain electrode 16 having two bends 116a and 116b such that a portion of the bent drain electrode 16 overlaps the gate line/electrode 12 and a pixel electrode 18 connected to a portion of the bent drain electrode 16. The bent drain electrode 16 is bent to follow a contour of a portion of the protrusion 19a of the data line 19 over the gate line/electrode 12, as shown in FIG. 4. The bent drain electrode 16 and the protrusion 19a are separated by a predetermined distance on an inner side of the region formed between the protrusion 19a and the gate line/electrode 12. The characteristics of one embodiment of the present invention will now be explained in more detail.

Figure 1A:
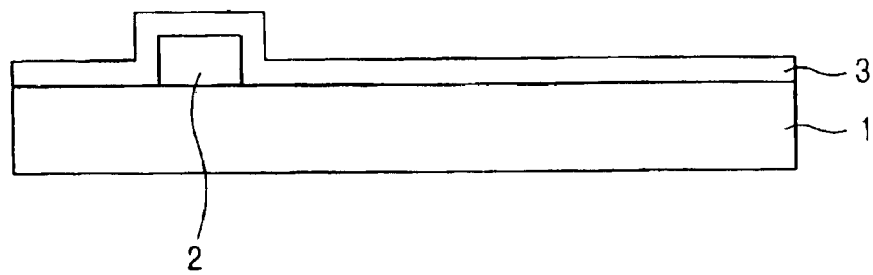
FIGS. 1A through 1E illustrate a sequential fabrication process of a general thin film transistor LCD.
Figure 1B:
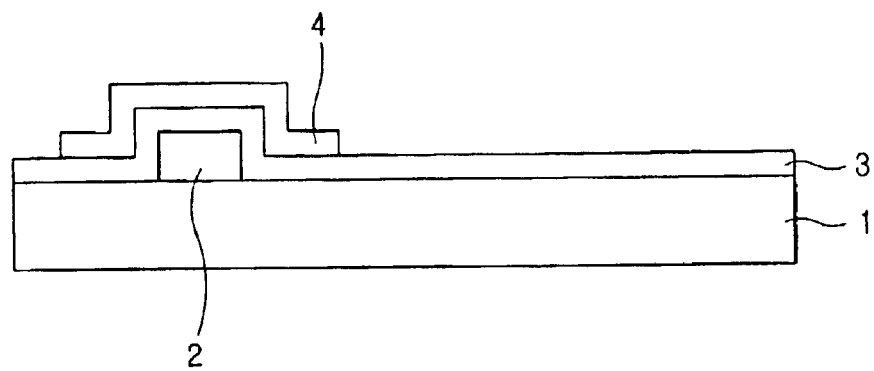
Figure 1C:
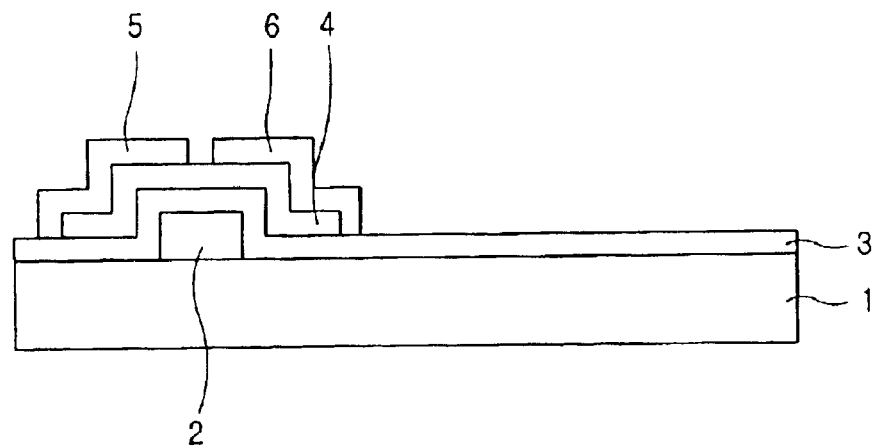
Figure 1D:
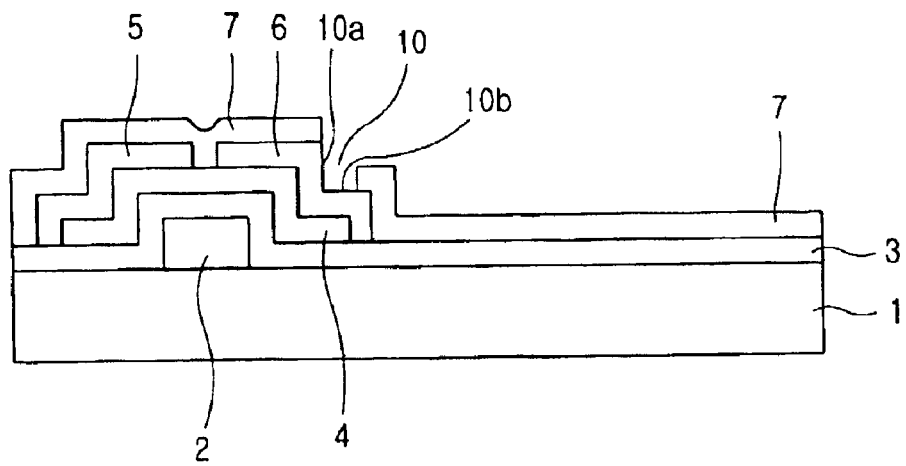
Figure 1E:
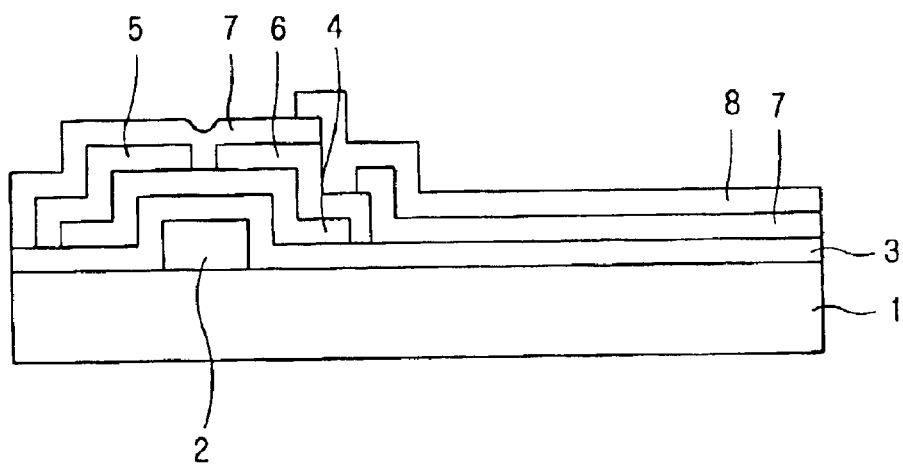
Figure 2:
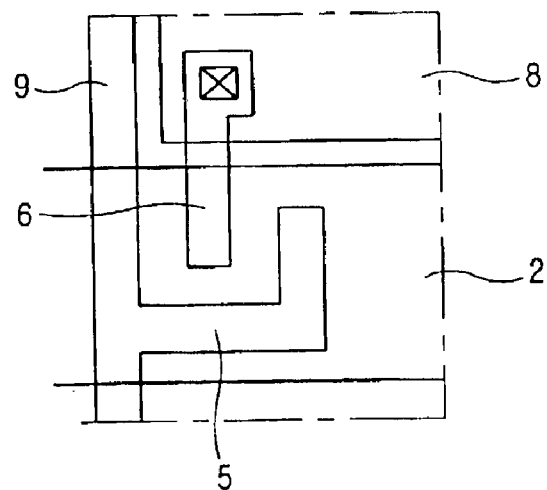
FIG. 2 is a plan view of a thin film transistor LCD in accordance with one conventional art.
Figure 3:
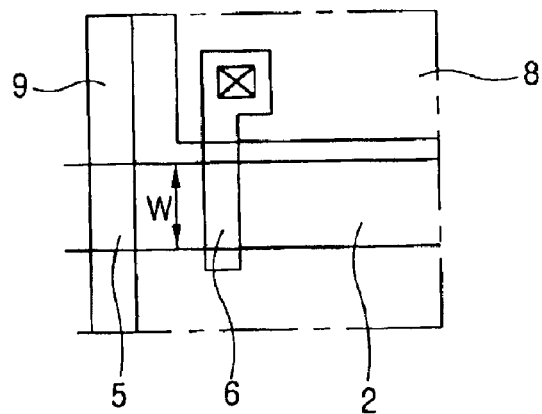
FIG. 3 is a plan view of a thin film transistor LCD in accordance with another conventional art.

The structure for a thin film transistor LCD in accordance with one embodiment of the present invention is advantageous in that the length of the channel region is independent of a vertical or horizontal position change of the gate line/electrode 12. Moreover, the length of the channel can be increased compared to the structure of the conventional art as shown in FIG. 3, in which the data line 9 extends vertically and has a horizontal protruded portion perpendicular to the vertical structure.

The channel is defined by the side length of the source electrode 5 where the data line 19 and the gate line/electrode 12 are overlapped. Because the protrusion 19a is parallel to the gate line/electrode 12, the protrusion can overlap the gate line/electrode 12 even without increasing the width of the gate line/electrode 12 to allow for process margin.

In addition, the gate line/electrode 12 extends horizontally and is parallel to the protrusion 19a. Thus, the protrusion 19a overlaps a central lower portion of the gate line/electrode 12 so that the source electrode 15 is formed to be '⊦'.

The drain electrode 16 is a predetermined distance from the data line 19 and positioned in parallel to the data line 19 to extend vertically in the context of the figure from the pixel electrode 18 in the pixel region defined by the gate line/electrode 12 and the data line 19. Over the gate line/electrode 12, the drain electrode 16 bends to have a horizontal portion parallel to the protrusion 19athat extends horizontally from the data line 19. That is, in the context of the figure, the drain electrode 16 extends parallel to the data line 19 until a predetermined point above the protrusion 19a, and then the drain electrode bends to extend horizontally above and parallel to the protrusion 19a. Adjacent the distal end 19b of the protrusion 19a, the drain electrode 16 bends to extend vertically over the gate line/electrode 12. The drain electrode 16 does not overlap the distal end 19b of the protrusion 19a. The vertical portion of the data electrode 16 extends beyond the gate line 12.

That is, the drain electrode 16 is formed of a first portion 16a in the vertical direction, a second portion 16b in the horizontal direction and a third portion 16c in the vertical direction such that the length of the channel between the data line 19 including the protrusion 19aand the drain electrode 16, that is, the width of the channel, is increased over the conventional art.

In the above described structure, even though the position of the gate line/electrode 12 may change vertically or horizontally, there is no change in the width of the channel, and especially, the area of the portion where the gate line/electrode 12 and the data line 19 are overlapped remains unchanged.

As above mentioned, since the areas of the source and the drain are not changed even though the position of the gate line/electrode 12 is changed, a capacitance between the gate line/electrode 12 and the source electrode 15 and between the gate line/electrode 12 and the drain electrode 16 is constantly maintained.

The second portion 16b of the drain electrode 16 is parallel to the longitudinal direction of the gate line/electrode 12, and the protrusion 19a of the data line 19 is parallel to the gate line/electrode 12 in the longitudinal direction, so that the structure can be accomplished even without intentionally increasing the width of the gate line/electrode 12. In other words, by increasing the width of the channel rather than the width of the gate line 12, a wider channel width can be obtained without causing problems of reduced aperture efficiency of the display device and reduction of the light efficiency.

Figure 5:
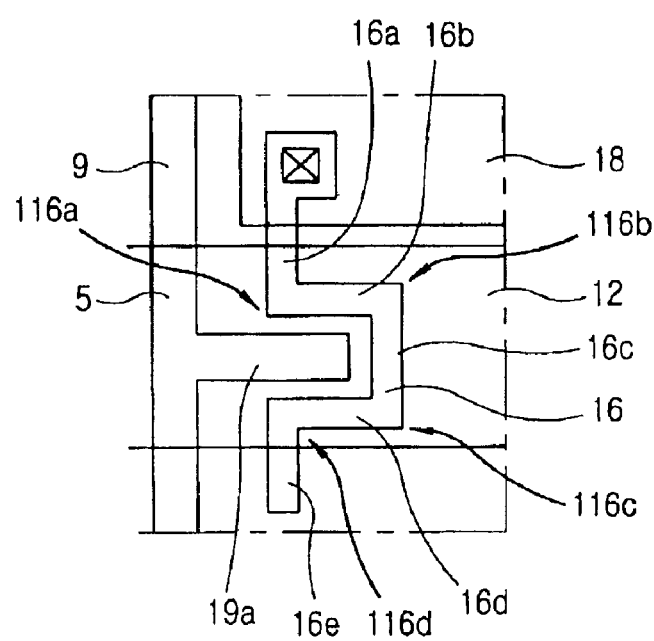
FIG. 5 is a plan view of a thin film transistor LCD in accordance with another embodiment of the present invention.

FIG. 5 is a plan view of a thin film transistor LCD in accordance with another embodiment of the present invention.

As shown in FIG. 5, a structure of a thin film transistor LCD in accordance with another embodiment of the present invention includes a gate line/electrode 12 extending horizontally in the context of the figure and a data line 19 extending vertically in the context of the figure. The data line 19 has a protrusion 19a on one side that extends horizontally from the data line 19 and overlaps a central portion of the gate line/electrode 12. In this way, the portion of the data line 19 overlapping the gate line/electrode 12 and the protrusion 19a together serve as a source electrode 15 for a thin film transistor. The thin film transistor LCD further includes a time bent drain electrode 16 having four bends 116a, 116b, 116c, and 116d such that a portion of the bent drain electrode 16 overlaps the gate line/electrode 12 and a pixel electrode 18 connected to a portion of the bent drain electrode 16. The bent drain electrode 16 is bent both to be parallel to a vertical portion of the data line 19 and at the protruded portion from a predetermined distance; and a pixel electrode 8 connected to the extended portion of the drain electrode 6. The bent drain electrode 16 is bent to follow a contour of a portion of the protrusion 19a of the data line 19 over the gate line/electrode 12, as shown in FIG. 5. The bent drain electrode 16 and the protrusion 19a are separated by a predetermined distance on an inner side of the region formed between the protrusion 19a and the gate line/electrode 12. The characteristics of one embodiment of the present invention will now be explained in more detail.

The structure for a thin film transistor LCD in accordance with this embodiment of the present invention is advantageous in that the length of the channel region is increased compared to the structure as shown in FIG. 4. Moreover, the drain electrode 16 is changed to be formed facing the source electrode 15 within the region where the drain electrode 16 overlaps the gate line/electrode 12.

The channel is defined by the side length of the source electrode 5 where the data line 19 and the gate line/electrode 12 are overlapped. Because the protrusion 19a is parallel to the gate line/electrode 12, the protrusion can overlap the gate line/electrode 12 even without increasing the width of the gate line/electrode 12 to allow for process margin.

In addition, the gate line/electrode 12 extends horizontally and is parallel to the protrusion 19a. The protrusion 19a overlaps a central portion of the gate line/electrode 2 so that the source is formed to be '┝'.

The drain electrode 16 is a predetermined distance from the data line 19 and positioned in parallel to the data electrode 16 to extend vertically in the context of the figure from the pixel electrode 18 in the pixel region defined by the gate line/electrode 12 and the data line 19. Over the gate line/electrode 12, the drain electrode 16 is bent to have a two horizontal portions parallel to the protrusion 19a that extends horizontally from the data line 19 and three vertical portions. That is, in the context of the figure, the drain electrode 16 extends parallel to the data line 19 until a predetermined point above the protrusion 19a, and then the drain electrode 16 bends to extend horizontally above and parallel to the protrusion 19a. Adjacent the distal end 19b of the protrusion 19a, the drain electrode 16 bends to extend vertically over the gate line/electrode 12. The drain electrode 16 does not overlap the distal end 19b of the protrusion 19a. In the context of the figure, in the region below the distal end 19b of the protrusion 19a, the drain electrode 16 again bends to extend horizontally toward the data line 19 to be again parallel to the protrusion 19a. At a predetermined distance from the data line 19, the drain electrode 16 bends again to extend vertically and again be parallel to the data line 19. Although not necessary, the vertical portion of the data electrode 16 extends beyond the gate line 12.

That is, the drain electrode 16 is formed of a first portion 16a in the vertical direction, a second portion 16b in the horizontal direction, a third portion 16c in the vertical direction, a fourth portion 16d in the horizontal direction, and a fifth portion 16e in the vertical direction, such that the length of the channel between the data line 19 including the protrusion 19a and the drain electrode 16, that is, the width of the channel, is increased over the conventional art.

In the above described structure, even though the position of the gate line/electrode 12 may change vertically or horizontally, there is no change in the width of the channel, and especially, the area of the portion where the gate line/electrode 12 and the data line 19 are overlapped remains unchanged As above mentioned, since the areas of the source and the drain are not changed even though the position of the gate line/electrode 12 is changed, a capacitance between the gate line/electrode 12 and the source electrode 15 and between the gate line/electrode 12 and the drain electrode 16 is constantly maintained.

The second and fourth portions 16b and 16d of the drain electrode 16 is parallel to the longitudinal direction of the gate line/electrode 12, and the protrusion of the data line 16 is parallel to the gate line/electrode 12 in the longitudinal direction, so that the structure can be accomplished even without intentionally increasing the width of the gate line/electrode 12. In other words, by increasing the width of the channel rather than the width of the gate line 12, a wider channel width can be obtained without causing problems of reduced aperture efficiency of the display device and reduction of the light efficiency.

As so far described, the structure of the thin film transistor LCD includes the source protruded in the direction parallel from the data line to the gate electrode and the drain bent according to the formation of the source, so that a wider channel can be obtained even without increasing the width of the gate electrode. Thus, the characteristics such as the light efficiency of the display device and the aperture efficiency can be prevented from degrading. In addition, the degree of mobility of the electric charge is improved through the channel of the thin film transistor, so that the characteristic of the device can be improved accordingly.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A Liquid Crystal Display (LCD), comprising:
a data line;
a source electrode protruded for a predetermined length from the data line;
a gate electrode overlapping a portion of the source electrode and the data line;
a gate line substantially perpendicular to the data line, wherein the gate line is integral with the gate electrode;
a drain electrode having a portion overlapped with the gate electrode; and
a pixel electrode connected to the drain electrode.
wherein the drain electrode includes a first region parallel to the data line, a second region perpendicular to and extending from the first region and parallel to an upper portion of the source electrode, and a third region extending from the second region, parallel to the data line, and disposed along an end of the source electrode.

2. The liquid crystal display device of claim 1, wherein an area of the region where the gate line overlaps the source electrode and the drain electrode is constant, and substantially independent of the width of the gate line.

3. The liquid crystal display device of claim 1, wherein the source electrode and the drain electrode are spaced apart with a predetermined distance there between.

4. A liquid crystal display device, comprising:
a data line;
a gate line substantially perpendicular to the data line;
a source electrode protruding perpendicularly from the data line and having a predetermined length;
a drain electrode having a portion overlapping the gate line; and
a pixel electrode connected to the drain electrode,
wherein the source electrode and the drain electrode are spaced apart by a predetermined distance, and wherein the drain electrode includes a first region parallel to the data line, a second region extending from and perpendicular to the first region and parallel to an upper portion of the source electrode, and a third region extending from and perpendicular to the second region, parallel to the data line, and disposed along an end of the source electrode.

5. The liquid crystal display device of claim 4, wherein an area of the region where the source electrode and the drain electrode overlap the gate line is unchanged, and substantially independent of the width of the gate line.

6. The liquid crystal display device of claim 4, wherein the source electrode and the drain electrode are spaced apart with a predetermined distance there between.

* * * * *